Patented Oct. 6, 1953

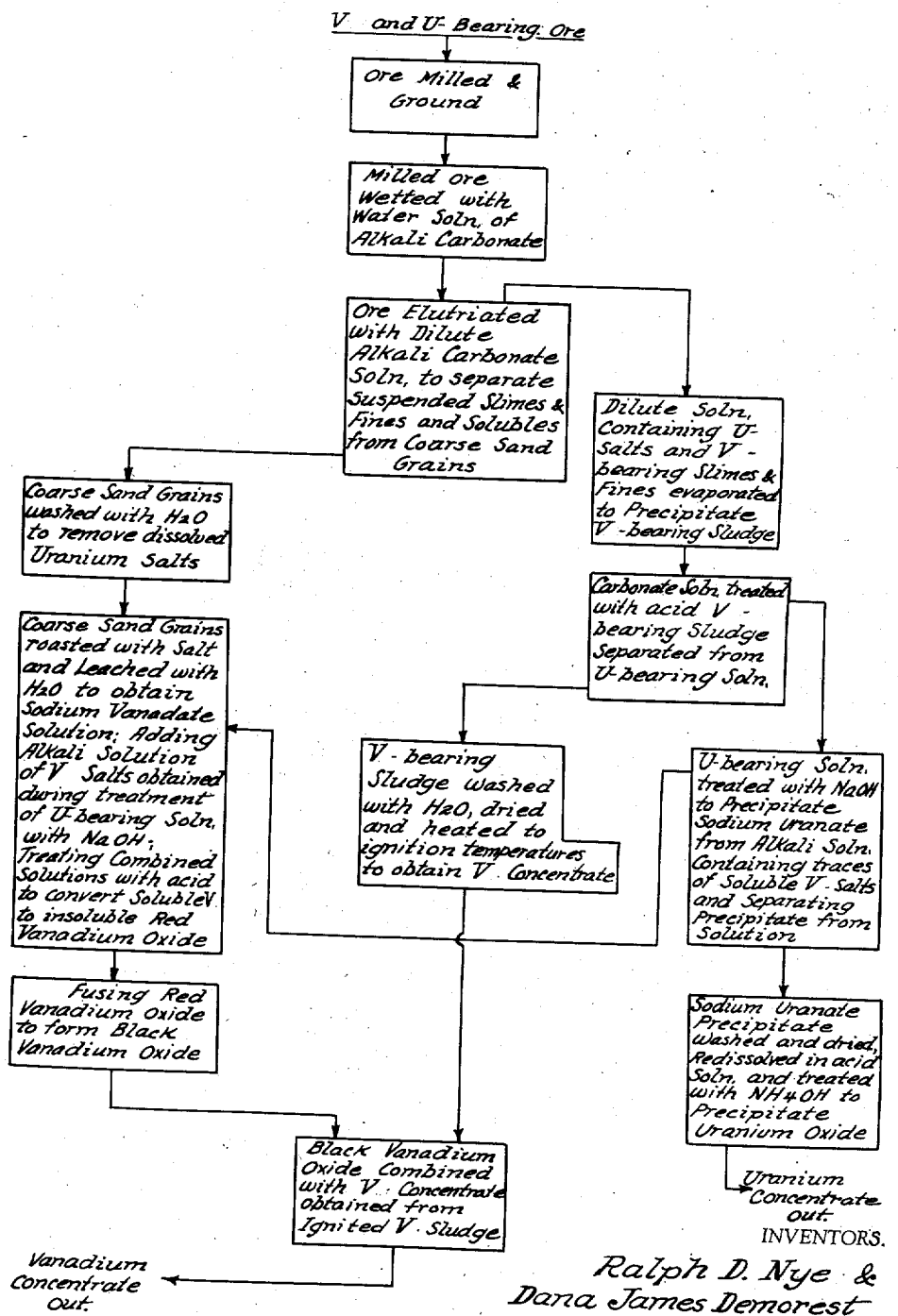

2,654,653

UNITED STATES PATENT OFFICE 2,654,653

METHOD OF PRODUCING CONCENTRATES OF URANIUM AND VANADIUM FROM LOW-BEARING ORES

Ralph D. Nye and Dana James Demorest, Columbus, Ohio

Application August 8, 1949, Serial No. 109,234

4 Claims. (Cl. 23—14.5)

The present invention relates to an improved method for treating sand-stone-like ores, such as carnotite-bearing ores, to obtain therefrom concentrates of uranium and vanadium compounds, such as uranium and vanadium oxides, and also to a method of alloying iron or steel with the concentrate of vanadium compounds obtained from the treatment of such ores.

The present invention is believed to constitute an improvement over the method disclosed in our prior United States Patent No. 2,442,429, dated June 1, 1948, and entitled Method of Extracting Uranium, Radium and Vanadium From Their Ores.

It is the primary object of the present invention to provide an improved method of treating relatively low-bearing sand-stone ores containing carnotite and/or similar minerals to obtain therefrom concentrates of uranium and vanadium oxides.

It is another object of this invention to provide a method for obtaining vanadium and uranium concentrates from relatively low-bearing ores which may be performed with efficiency and economy whereby to provide a commercially practicable method or process of obtaining concentrates of these metals at the source of supply, and thereby eliminate expensive handling and shipment of the low grade ores from their relatively remote source of supply to a processing area.

It is still a further object of the present invention to provide a method of extracting uranium and vanadium concentrates from low-bearing ores which utilizes relatively inexpensive reagent materials, and which makes possible the reactivation of such materials for subsequent use in successive method steps, in order to conserve, to a maximum degree, the reagents used in carrying forth the present method.

Yet another object of the present invention is to prepare mechanically a concentrate of vanadium oxides from one portion of the low-bearing ore, and to prepare chemically a second concentrate of vanadium from the remaining portion of the ore, and thereafter to form a combined concentrate by mixing the mechanically and chemically produced vanadium oxide concentrates.

Another object of this invention is to provide an improved method for alloying iron and steel with the combined vanadium-bearing concentrate obtained from the method of the present invention.

According to the present invention, relatively low-bearing vanadium and uranium-containing ores, such as carnotite, are operated upon to extract concentrates of these two valuable elements. Generally, ores of this type comprise a relatively large proportion of worthless sand grains which are cemented or held together by that portion of the ore which contains the valuable mineral constituents. The problems encountered in providing a commercially successful method of obtaining the valuable mineral constituents from ores of this type stem from the difficulty of separating the valuable cementing materials from the worthless siliceous and organic matter which comprises the majority of the ore bulk.

Carnotite may be generally defined as a mineral which comprises oxides of vanadium, uranium and potassium and water of crystallization and small traces of radium in intimate association with the uranium. Low-bearing carnotite ores may contain as little as 0.10% of uranium oxide ($U_3O_8$), and from 0.5 to 3% of vanadium oxide ($V_2O_5$). It will thus be seen that considerable bulk or volume of ore must be operated upon to obtain a relatively small quantity of the valuable vanadium and uranium oxides.

In accordance with the present invention, carnotite-bearing or similar ores are first milled and ground to approximately 40 mesh screen size, care being taken in the milling and grinding operations to prevent the crushing of individual quartz sand grains and the loss of powder or dust particles which, in most instances, comprise the valuable cementing materials which normally hold the metal oxides around and between the individual sand grains of the ore.

After milling and grinding, the ore and sand grains are adequately wetted to a viscous fluid consistency with a heated water solution of an alkali metal carbonate, such as sodium or potassium carbonate, or with ammonium carbonate, hereinafter referred to generally as an alkali carbonate. Thereafter, the wetted ore and sand grains are preferably milled, mixed and heated with the alkali carbonate to insure complete contact with the carbonate solution and abrasion between the outer surfaces of the larger sand grains in order that chemical reaction may be had between the oxides of uranium disposed upon the surfaces of the larger sand grains and the carbonate solution. During this initial treatment of the ore and sand grains with the carbonate solution, that portion of the uranium oxide which is disposed upon the surfaces of the larger size sand grains is taken into solution or dissolved or released from adherence with the sand grains. Portions of certain bituminous and organic materials, and relatively finely divided mineral grains below 200 mesh screen size and aluminous clay materials, hereinafter referred to as fines and slimes, are separated from the coarser sand and grains and put in a condition to be floated and/or carried in colloidal suspension upon further dilution of the ore. The milling and mixing of the ore after initial treatment with the alkali carbonate solution is preferably carried out for a relatively short period of time sufficient only to have the alkali carbonate react with nearly all the uranium oxides disposed upon the outer surfaces of the larger size sand grains.

After initial treatment with the alkali carbonate, and milling and mixing, the ore is then elutriated with, or subjected to upward washing currents of additional dilute alkali carbonate solution which may be heated and which is in sufficient quantity to carry off the previously separated bituminous and organic materials and the fines and slimes of the ore. This elutriation step may be carried out with any suitable apparatus, but preferably a recirculating system of the alkali carbonate is employed for purposes of economy and efficiency, such system making provision for the washing of the coarse sand grains within a first vessel or system of vessels, while carrying off from the top of such vessels the floating and suspended slimes and fines which are subsequently deposited in a second treating vessel. The elutriation by the dilute alkali carbonate solution which may be heated, if necessary, provides for the agitation and self-attrition of the relatively coarse sand grain constituent of the ore above approximately 200 mesh screen size. Further, the elutriation insures complete contact between the carbonate solution and the outer surfaces of the larger size ore grains, and thus effectively separates the entire uranium oxide content of the ore from such larger sand grains. It will be realized that the larger sand grain residue, herein referred to, may comprise as much as 80 to 90% by weight of the original ore being treated, and thus, by carrying off the fines and slimes and valuable cementing materials for further treatment to obtain the soluble uranium content, the volume of the ore undergoing further treatment is considerably reduced over that initially operated upon.

During treatment of the ore and sand grains with the carbonate solutions, it is important to note that most of the calcium and magnesium carbonate content originally contained in the ore is carried off into the slimes by elutriation of the ore, which greatly expedites and facilitates treatment of the coarse sand grain constituents of the ore by a subsequent salt roasting process.

High percentages of calcium and magnesium compounds within the ore adversely affect and impede subsequent salt roasting operations and sulphuric acid treatment to extract a vanadium concentrate from the ore. Thus, the larger size coarse sand grains resulting after treatment and elutriation with the alkali carbonate solution are rendered highly suitable for a subsequent salt roasting operation to obtain a vanadium concentrate therefrom, by reason of the fact that the calcium and magnesium compounds originally contained in the ore are carried off from the sand grains with the slimes and soluble uranium-containing materials.

As previously stated, the carbonate solution used in the elutriation of the wetted ore, and which carries the valuable slimes and fines and dissolved uranium, is preferably recovered in a second vessel. This solution, together with the fines and slimes, should contain all of the uranium oxides originally disposed upon the outer surfaces of the larger sand grains, and in effect, the entire uranium content of the original ore, the same having been taken into the hot solution (80° to 90° C.) during the initial treatment with the carbonate solution, and also during the subsequent elutriation of the ore and sand particles with the dilute carbonate solution.

The relatively coarse sand grains, above 200 mesh screen size, remaining after the elutriation of the ore, contain a large proportion of the vanadium oxide content of the original ore, and are subjected to an additional countercurrent washing operation with fresh water to remove substantially all the carbonate solution and valuable fines and slimes therefrom. The wash water solution utilized in this step is thereafter preferably used to dissolve the alkali carbonate used in the initial ore wetting step, it being understood that conservation of water and reagent materials is of extreme economical importance to the present process, as the same is highly adaptable in treating ores at their source, and in ordinarily semi-arid districts. After washing with fresh water, the coarse sand grains are entirely freed of the soluble uranium content of the ore, and the organic and bituminous materials associated therewith, but contain a large proportion of the vanadium content of the ore carried by or associated with the larger sand grains.

The dilute carbonate solution containing slimes and fines and dissolved uranium compounds, as previously stated, is collected in a second vessel. This material may then advantageously be heated, stirred and evaporated to reduce the volume thereof and to concentrate the alkali carbonate in a manner to take into solution all of the uranium oxides associated with the suspended or floating slimes and fines. During this step additional carbonate may be added, if necessary, to expedite the dissolving of the uranium oxides and to insure complete reaction thereof with the carbonate solution. The heating and evaporation of the dilute carbonate solution will ordinarily flocculate the suspended slimes, and cause same to precipitate and carry down other floating and suspended fines in order that the insoluble vanadium-containing fines, slimes, organic and clay materials may be filtered off from the uranium-containing solution while such solution remains in a basic alkaline condition and prior to acid treatment in the following step. This separation of the insoluble vanadium-containing materials from the uranium-containing solution prior to acid treatment enables the majority of the vanadium compounds to remain insoluble and prevents the same from being taken into solution during the subsequent acid treatment of the solution.

After evaporation and concentration, the alkali carbonate solution and slimes and fines containing all of the uranium content of the original ore are treated with an acid, such as sulphuric acid, and if the slimes have not previously been precipitated and filtered off, the solution may be treated preferably with a metallic salt, such as barium chloride or lead chloride, capable of forming with the sulphuric acid a relatively dense and flocculent precipitate to aid in the settling of suspended or floating matter carried in the solution. The precipitate thus formed would mechanically carry down and separate all of the floating and suspended materials carried on or in the solution and result in the formation of a sludge precipitate in the bottom of the second vessel. The carrying down of the floating and suspended material after addition of sulphuric acid leaves a sufficiently acid supernatant solution above the precipitate in which is dissolved all of the valuable uranium content of the ore and a relatively small percentage of vanadium. The supernatant solution is then filtered to separate the same from the sludge precipitate, and thereafter, the sludge precipitate may be washed, filtered and dried, and heated to ignition temperatures to burn out all organic matter and drive off all free water therefrom to provide a mechanically made relatively concentrated mass containing a good proportion of the vanadium oxide content of the original ore which was mechanically removed from the ore during elutriation with the carbonate solution.

The acidified supernatant filtrate or solution obtained after flocculation and separation of the sludge precipitate, as aforementioned, contains all of the uranium value of the ore and is heated to expedite the removal of carbon dioxide therefrom. This solution is then treated with sodium hydroxide to precipitate sodium uranate ($Na_2U_3O_8$). The sodium uranate precipitate is filtered and washed, and thereafter acidified to carry the same back into solution, after which ammonium carbonate may be added to the acid solution to precipitate aluminum hydroxides which may also be filtered and washed and separated for further C. P. or commercial concentration. Uranium in the filtrate is then separated from the solution by acidifying, boiling and precipitating with ammonium hydroxide. There is some vanadium obtained from this step and it is preferably transferred into the solution of sodium vanadate hereinafter produced by a salt roast operation described in the following steps.

To further concentrate the vanadium content of the original ore, the coarse sand grains separated from the ore by treatment with the carbonate solution, and after washing, are mixed with salt (NaCl) in the approximate proportion by weight of 100 parts of sand grains to 7 parts of salt, and thereafter subjected to a salt roasting operation within a relatively simple single retort rotary, or similar type, furnace at a temperature of approximately 850° C. In this connection, it is important to note that in the usual salt roasting operation to obtain vanadium concentrates from whole or unclassified ores, it is customary to employ relatively large and expensive furnace equipment, such as multiple deck or compartment types of furnaces having moving arms which function to agitate and convey the ore and salt from one deck to another during heating operations, and in a manner to mix the ore with the salt and to prevent the loss of valuable dust or powder from the ore. To economically justify relatively large furnaces of this type, it is necessary that a large quantity of ore be treated in order to compensate for the relatively high investment and operational costs of such equipment.

In the present process, by previously concentrating part of the vanadium content of the ore and removing therefrom a relatively large percentage of the fines and organic and soluble constituents of the original ore, the coarse vanadium-bearing sand residue may be treated in a simple type of furnace such as a cylindrical rotating type after the addition of salt thereto in an economical and efficient manner without resorting to expensive equipment necessary when treating previously unprocessed ores to cause a complete reaction to occur between the salt and the vanadium oxide on the larger ore grains and to prevent the passage of dust or other value-containing fines from the furnace during the roasting operation.

During the salt roasting process, the vanadium oxide content of the ore carried upon the surfaces of the larger size sand grains is converted to sodium vanadate, and by leaching the coarse sand after roasting with water, the soluble sodium vanadate may be easily separated from the remaining worthless silica sand grains. To this solution, the vanadium-bearing filtrate from the above described sodium hydroxide precipitation of uranium is added. Thereafter, the sodium vanadate solution may be concentrated and treated with sulphuric acid to precipitate a reddish vanadium oxide, normally referred to as vanadic acid.

The reddish vanadium pentoxide chemically formed after salt roasting, leaching and acid treatment is preferably dried and heat-fused to form a black oxide of vanadium which contains approximately 85% of $V_2O_5$.

The chemically produced fused black oxide may then be crushed to any desired degree of fineness and mixed with the dried mechanically produced vanadium concentrate obtained after treatment of the carbonate solution with acid, and after washing, filtering, drying and ignition of the sludge. Thus, an enriched combined concentrate of vanadium oxides is obtained which contains substantially all of the vanadium content of the original ore, and contains about 25 to 35 percent of $V_2O_5$.

This combined vanadium oxide concentrate may advantageously be used to make additions of vanadium to molten iron or steel by mixing the same with other suitable compounds, such as ferro-silicon, aluminum, and/or nitre, and thereafter introducing such mixture within molten iron or steel to form, by an exothermic reaction, an iron-vanadium alloy. It has been found that the introduction of the combined vanadium oxide concentrate obtained herein, with added materials capable of reducing the vanadium pentoxide exothermically to metallic vanadium, and at the same time producing high temperature slag exothermically within molten iron or steel, creates very hot cleansing slag particles throughout the molten iron or steel, which particles rise in the molten iron and steel and tend to purify the same by carrying out deleterious materials or particles contained or suspended in the molten steel or iron which would ordinarily tend to produce an inferior grade of the iron-vanadium alloy.

Thus, it will be seen that the present invention provides an improved method for producing concentrates of oxides of vanadium and uranium from relatively low-bearing ores containing these materials, and further provides an end product in the form of the vanadium oxide concentrate which may advantageously be introduced directly within molten iron or steel, in combination with other suitable materials capable of reducing the vanadium oxide exothermically to metallic vanadium, to produce an improved iron-vanadium alloy.

To summarize the step by step operations of the present method of obtaining concentrates of vanadium and uranium from low-bearing ores, the following tabulation is offered:

Step 1 comprises the milling and grinding of the ore to approximately 40 mesh screen size;

Step 2 comprises wetting the milled and ground ore with a heated alkali carbonate solution while mixing and agitating the ore to insure even dispersion and reaction of the carbonate solution throughout the mass and to cause abrasion between the larger sand grains;

Step 3 comprises subjecting the initially carbonate-treated ore to elutriation with dilute alkali carbonate solution to separate floating, suspended and dissolved constituents of the original ore from coarse sand grain constituents above approximately 200 mesh screen size, and to further insure complete surface contact between the carbonate solution and the larger ore grains;

Step 4 comprises collecting the dilute carbonate solution with slimes and fines in a second vessel, heating and evaporating the same to flocculate the suspended slimes and take all uranium into the solution in order that the slimes may be filtered off from uranium-containing solution;

Step 5 comprises the treatment of the uranium-containing carbonate solution with an acid and optionally with a soluble metallic salt capable of forming a dense precipitate to carry down any remaining floating and suspended matter, leaving a clear supernatant uranium-containing acid solution;

Step 6 comprises washing and drying of the insoluble residue of slimes and fines and organic matter obtained from steps 4 and 5 and heating thereof to ignition temperatures to burn out organic material and drive off all free water, and to obtain a mechanically made concentrate of vanadium oxides;

Step 7 comprises treating the acid supernatant solution obtained from step 5 with sodium hydroxide to precipitate sodium uranate; and to obtain an alkaline solution containing a small percentage of soluble vanadium;

Step 8 comprises washing and drying of sodium uranate and treatment thereof with an acid to redissolve the sodium uranate, and ultimately precipitating uranium oxide ($U_3O_8$) by the addition of ammonium hydroxide to the dissolved uranate solution;

Step 9 comprises washing of coarse sand grain residue obtained from step 3 with water to remove therefrom remaining dissolved uranium compounds;

Step 10 comprises salt roasting of coarse sand grains to obtain therefrom chemically made sodium vanadate, and adding the vanadium-containing solution obtained from step 7 and thereafter treating the sodium vanadate with sulphuric acid to obtain red vanadium oxide or chemically vanadic acid;

Step 11 comprises fusing of red vanadium oxide to form black oxide of vanadium; and Step 12 comprises the mixing together of chemically made crushed and pulverized fused black vanadium oxide with the mechanically made vanadium concentrate obtained after ignition or burning of sludge precipitate from step 6.

In view of the foregoing, it will be seen that the method of the present invention is characterized by its efficiency and economy and its ease of operation in relatively semi-arid districts chiefly where uranium and vanadium-containing ores occur. It will be manifest that certain of the valuable reagent solutions and materials, such as the alkali carbonates used in the present process, may be reactivated or recovered after initial use for reuse in subsequent operations, thus conserving greatly upon the amount of reagents necessary to carry forth the process and the amount of water required in various washing and diluting operations. Also, by the initial treatment of ores to first separate the uranium-bearing constituents from the larger sand grains, and thereafter by further treatment of the separated materials (fines and slimes), with the reagent used in such operation being concentrated, the overall process is greatly expedited and rendered economically feasible.

By reason of the fact that the uranium oxide which exists on or is disposed upon the outer surfaces of the larger sand grains contained in carnotite or sand-stone ores reacts more readily with an alkali carbonate solution than does that portion of the uranium content associated with the fines and slimes, it is necessary to additionally subject the ore to the elutriation and evaporation steps to insure that substantially all of the uranium content is taken into solution, particularly that portion which is carried in close association with the fines and slimes. Thus, the present improved process which embodies the step of separating the coarse sand grains from the remainder of the ore by elutriation provides for the simultaneous complete reaction between the carbonate solution and the uranium content of the ore which is contained upon the outer surfaces of the sand grains and also that contained in association with the fines and slimes with the use of but a minimum of the valuable alkali carbonate reagent. Thereafter, the removed and dissolved material with the carbonate solution is further treated to obtain the entire uranium oxide content of the ore.

It will be understood that the present invention is largely adapted to initial concentration processes to obtain relatively highly concentrated mineral oxide values from low-bearing ores at the source of supply of such ores, and while the concentrates obtained from the present invention or method contain to a certain degree other matter or material, it will be manifest that the percentage of vanadium and uranium oxides within the combined concentrates obtained by the present method is sufficiently great that it is possible for the concentrates to be transported economically for further reduction of the valuable metal constituents.

We claim:

1. The method of obtaining concentrates of uranium and vanadium from low-bearing uranium and vanadium containing ores which comprises reducing the ore to a relatively finely divided state; wetting the reduced ore with an alkali carbonate solution; elutriating the wetted ore with a dilute alkali carbonate solution to separate substantially the entire uranium-bearing and at least a part of the vanadium-bearing constituents of the ore from the relatively coarse sand grain constituents thereof; heating and evaporating the dilute alkali carbonate solution containing the separated uranium and vanadium constituents of the ore to reduce the volume of such solution and to dissolve all of the uranium contained therein; acidifying the evaporated alkali carbonate solution; filtering the acidified solution to separate an acid supernatant uranium containing solution from an undissolved vanadium containing residue; heating the vanadium-containing residue to ignition temperatures to burn out all organic material and evaporate all free water contained therein and to obtain a first vanadium concentrate from that portion of the ore separated from the original mass during the elutriation thereof; adding to the supernatant uranium-containing solution an alkali metal hydroxide to precipitate an alkali metal uranate; separating said alkali metal uranate from the solution after the addition of said alkali metal hydroxide and chemically reducing the alkali metal uranate to uranium oxide.

2. The method of obtaining concentrates of uranium and vanadium from relatively low-bearing ores containing such elements which comprises reducing the ore to a relatively finely divided state; adding to the reduced ore a heated alkali carbonate solution in sufficient quantity to render the ore in a viscous fluid state and to initially remove from adherence the cementing and sand grain constituents of the ore; elutriating the ore with a relatively dilute alkali carbonate solution to separate dissolved, suspended and floating constituents of the ore from the coarser sand grain constituent thereof and to remove all the uranium-bearing portion of the ore from such coarse sand grain constituent; evaporating the elutriant containing the dissolved, floating and suspended constituents of the ore to reduce the volume thereof and to flocculate and precipitate suspended and floating vanadium-containing fines and slimes and to completely dissolve the uranium content of the ore removed from the coarser sand grain constituent thereof; separating the dissolved uranium-containing alkali carbonate solution from the precipitated vanadium-containing fines and slimes; and heating the vanadium-containing fines and slimes to ignition temperatures to burn out organic matter and remove free water therefrom and to obtain a vanadium concentrate.

3. The method of obtaining concentrates of uranium and vanadium from ores containing such elements which comprises reducing the ore to a relatively finely divided state; wetting the reduced ores with a heated alkali carbonate solution to dissolve a portion of the uranium content of the ore and to release from adherence with the coarser sand grain constituent of the ore the remaining undissolved uranium-containing constituents thereof and a part of the vanadium-containing constituents of the ore; separating the dissolved portion of the wetted ore and the remaining undissolved uranium and vanadium-containing constituents from the coarser sand grain constituent thereof by elutriation of the ore with a dilute alkali carbonate solution; evaporating the elutriant containing the undissolved uranium and vanadium-containing constituents of the ore to reduce the volume thereof and to take into solution all of the uranium content of the original ore; thereafter separating the uranium containing solution from the undissolved material contained therein to obtain a uranium-pregnant solution for further reduction to uranium concentrate; and salt roasting the coarser sand grain constituent of the ore remaining after the elutriation thereof to obtain a concentrate of sodium vanadate.

4. The method of obtaining concentrates of uranium and vanadium from ores containing such elements which comprises reducing the ore to a relatively finely divided state; wetting the reduced ores with a heated alkali carbonate solution to react with a portion of the uranium content of the ore and to release from adherence with the coarser sand grain constituent of the ore the remaining unreacted uranium-containing constituents thereof and a part of the vanadium-containing constituents of the ore; separating the reacted portion of the wetted ore and the remaining unreacted uranium and vanadium-containing constituents from the coarser sand grain constituent thereof by elutriation of the ore with an alkali carbonate solution; evaporating the elutriant containing the reacted portion of the uranium content of the ore and the unreacted uranium and vanadium-containing constituents of the ore to take into solution substantially all of the uranium content of the original ore; and thereafter separating the uranium-containing concentrate from the undissolved material contained therein to obtain a uranium-pregnant solution for further reduction to uranium concentrate and a vanadium-containing sludge for further reduction to a vanadium concentrate.

RALPH D. NYE.
DANA JAMES DEMOREST.

References Cited in the file of this patent
UNITED STATES PATENTS

| Number | Name | Date |
|---|---|---|
| 1,065,581 | Bleecker | June 24, 1913 |
| 1,165,692 | Moore | Dec. 28, 1915 |
| 1,195,698 | McCoy | Aug. 22, 1916 |
| 1,438,357 | Bleecker | Dec. 12, 1922 |
| 2,442,429 | Nye | June 1, 1948 |